United States Patent
Averill et al.

(10) Patent No.: US 7,925,857 B2
(45) Date of Patent: Apr. 12, 2011

(54) METHOD FOR INCREASING CACHE DIRECTORY ASSOCIATIVITY CLASSES VIA EFFICIENT TAG BIT RECLAIMATION

(75) Inventors: Duane A. Averill, Rochester, MN (US);
Herman L. Blackmon, Moline, IL (US);
Joseph A. Kirscht, Rochester, MN (US);
David A. Shedivy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 12/019,068

(22) Filed: Jan. 24, 2008

(65) Prior Publication Data
US 2009/0193199 A1    Jul. 30, 2009

(51) Int. Cl.
*G06F 13/00* (2006.01)
(52) U.S. Cl. ................... 711/170; 711/128; 711/141
(58) Field of Classification Search ............ 711/128, 711/141, 170
See application file for complete search history.

(56) References Cited

U.S. PATENT DOCUMENTS 6,138,209 A * 10/2000 Krolak et al. ............. 711/128
6,192,458 B1 * 2/2001 Arimilli et al. ............ 711/220

* cited by examiner

*Primary Examiner* — Reba I Elmore
(74) *Attorney, Agent, or Firm* — Bockhop & Associates LLC

(57) ABSTRACT

In a method of generating a cache directory to include a plurality of associativity classes, each associativity class includes an address tag including a plurality of address bits. Each address tag is configured to store a unique address to a specific location in an memory space. An amount of memory that is in an actually configured portion of the memory space is determined. A minimum number of bits necessary to address each memory location in the actually configured portion of the memory space is determined. Each address tag is configured in each associativity class to include the minimum number of bits necessary to address each memory location in the actually configured portion of the memory space. The cache directory is configured to include a maximum number of associativity classes per line in the cache directory.

14 Claims, 5 Drawing Sheets

METHOD FOR INCREASING CACHE DIRECTORY ASSOCIATIVITY CLASSES VIA EFFICIENT TAG BIT RECLAMATION

BACKGROUND OF THE INVENTION

1. Field of the Invention

The present invention relates to computer systems employing a cache coherency directory and, more specifically, to a system for increasing the number of associativity classes in a cache directory.

2. Description of the Prior Art

A cache is a collection of data that stores, in a relatively fast memory system, duplicates of data stored elsewhere in a relatively slower memory system. Frequently accessed data can be stored for rapid access in a cache. During processing of the data, cached data can be accessed rather than the original data. Once the cached data has not been accessed for a given amount of time, the cached data is written back to its original memory location and room in the cache is made for new data. Processing speed can be improved significantly through use of a cache.

Use of a cache presents a challenge in multiprocessor systems. This is because each processor may use its own cache, but all of the processors may share the same main memory. In this case, if two different processors access the same data, but operate on it in the own caches, then the data can become incoherent. Therefore, a cache coherency directory is often used to maintain the coherency of the caches in a multiprocessor system. A cache coherency directory records the addresses and the status of each cache line in a system.

To operate a cache coherency directory effectively, the system must employ a cache coherency protocol. One example of a cache coherency protocol, MESI (Modified—Exclusive-Shared—Invalid), supports efficient maintenance of a cache. In the protocol, each cache line is assigned one of four states, including: Modified, in which the cache line is present only in the current cache, but has been modified from the corresponding value in main memory. The cache must write the currently-stored data back to main memory before any other read of the corresponding main memory location; Exclusive, in which the cache line currently matches main memory; Shared, in which the cache line may be stored in other caches of the machine; and Invalid, in which the cache line is invalid.

For example, in a computer system with four processor busses and one processor socket per bus. Each processor socket most likely contains one or more levels (L1/L2) of on-die cache. The four processor bus segments are connected to a northbridge capable of satisfying memory and I/O requests as well as tasked with maintaining cache coherency amongst the bus segments. Several methods are known for maintaining coherency in a multiple processor bus system. One approach is to broadcast all snoops on the other processor bus segments. A second solution utilizes a coherence directory (or snoop filter) in the northbridge to track cache lines as they are requested by the processors. A coherency directory's usefulness increases as the number of processor bus segments grows. For example, broadcast snoop traffic in a four bus system reduces the usable bus bandwidth to only 25% of the theoretical peak.

A coherency directory eliminates (filters) snoops to busses known not to contain the requested cache line. Maximizing the coherence directory's tracking capability results in a higher hit rate and therefore better performance.

Sectoring is one common method to increase coverage of the coherence directory. A typical sectoring approach would be one address tag for two adjacent cache lines. For each address tag, there are two cache (MESI) states, one for each cache line. The number of associativity classes supported by the cache directory is limited by the width (number of bits) of the physical storage array (i.e. eDRAM, SRAM) and the information stored per class within the array. One portion of the class information is the address tag field. The address tag within each associativity class must contain enough bits to identify all useable system memory locations uniquely. Taken to an extreme, the maximum system memory capacity dictates the size of the address tag field required. However, even though a system has a maximum memory capacity, the actual physical memory installed may be much less. Several reasons may explain why the maximum memory capacity is not achieved, for example the memory technology required to realize maximum capacity may not yet be available, or if available, is too expensive. Also, the user might not require the maximum memory capacity for a particular application. In such cases, the most significant bits of the address tag field will never be used. Thus, the chip area consumed for these bits is unused and essentially wasted.

In a cache-coherent distributed memory (NUMA) computer system, total system memory is subdivided among various the nodes. For various reasons, such systems are often configured with gaps in the system address map. One motivation for doing this may be programming simplicity by allocating an equal portion of the total system address space to each node. Another reason may be to allow additional address space on each node for systems supporting hot memory add. For systems configured in this way, the amount of physical memory, such as dynamic random access memory (DRAM), may be significantly less than the span of system addresses. For a directory-based coherence protocol, system address gaps necessitate a larger address tag (number of bits) than if the system addresses were contiguous. As a result, address tag bits may go unused.

Generally, cache directory performance is enhanced in proportion to the number of associativity classes in the cache directory. When a system employs certain memory configurations (such as those with less memory than the maximum capacity for the system) each associativity class may have one or more unused higher order bits. Current systems do not employ such unused bits to create new associativity classes.

Therefore, there is a need for a system that employs unused tag bits from several associativity classes to create additional associativity classes.

SUMMARY OF THE INVENTION

The disadvantages of the prior art are overcome by the present invention which, in one aspect, is a method of generating a cache directory to include a plurality of associativity classes. Each associativity class includes an address tag including a plurality of address bits. Each address tag is configured to store a unique address to a specific location in an memory space. An amount of memory that is in an actually configured portion of the memory space is determined. A minimum number of bits necessary to address each memory location in the actually configured portion of the memory space is determined. Each address tag is configured in each associativity class to include the minimum number of bits necessary to address each memory location in the actually configured portion of the memory space. The cache directory is configured to include a maximum number of associativity classes per line in the cache directory.

In another aspect, the invention is a method of increasing a number of associativity classes that can be stored in a cache directory in a digital system that employs a memory configuration that employs less than a system maximum amount of memory. Extra bits in address tags in existing associativity classes in which the extra bits are not necessary to address the memory configuration are identified. Existing associativity classes are redefined so as not to require the extra bits. The cache directory is redefined so as to include additional associativity classes that include the extra bits.

In yet another aspect, the invention is a cache directory for managing cache coherency with respect to an memory space. A memory space configuration detector generates a configuration signal having a value representative of an actual amount of physical memory configured in the memory space. A plurality of cache lines each include a plurality of address tag bits and a plurality of MESI bits. A plurality of selectors are each coupled to a different one of the address tag bits and are each responsive to the configuration signal. Each selector is configured to direct a data value of an address tag bit to a selected one of a plurality of different associativity classes in the cache directory, depending on the value of the configuration signal.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
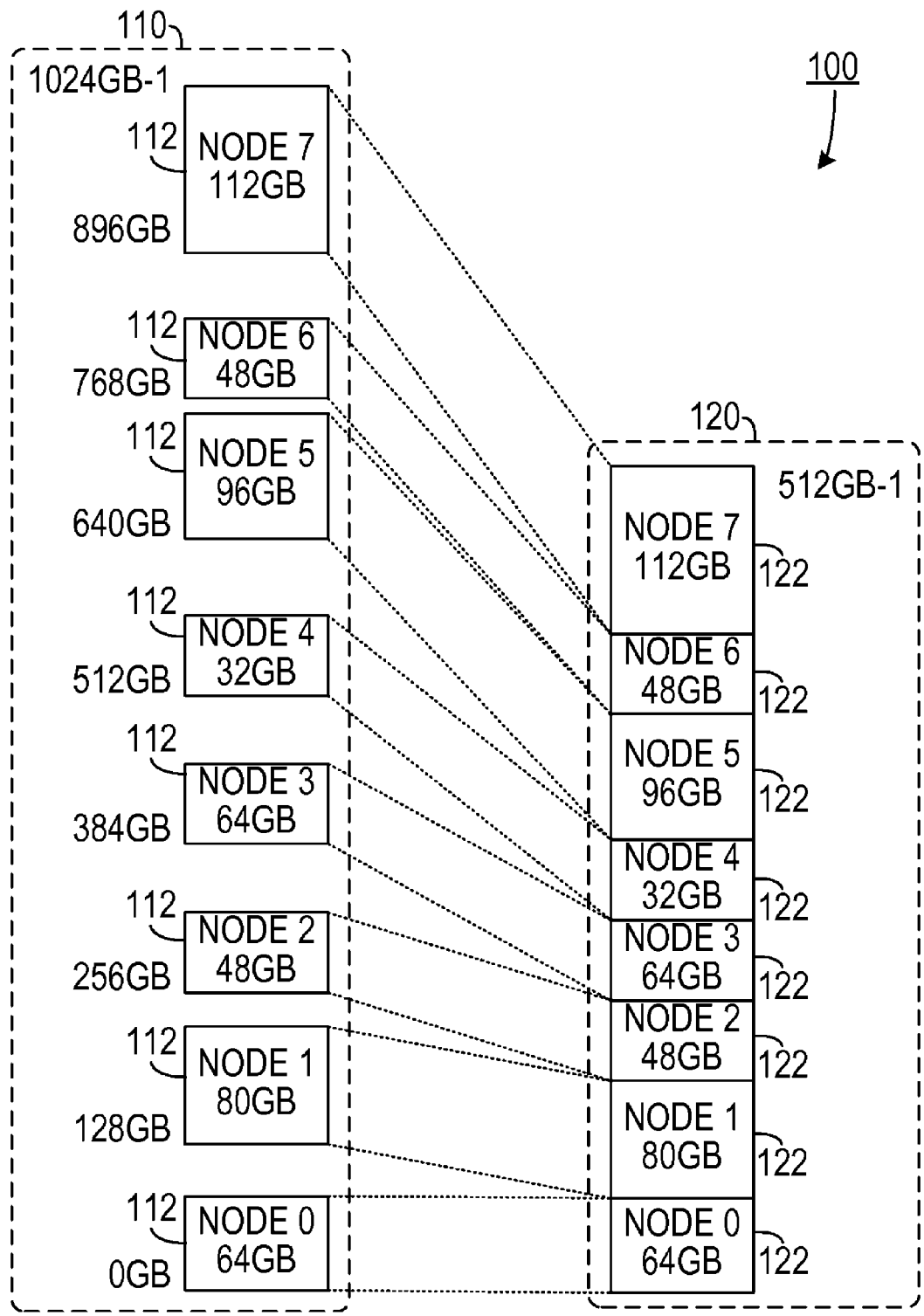
FIG. 1 is a schematic diagram showing a system that maps partially-filled nodes to a contiguous memory space.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The invention solves the problem of wasted resource by reclaiming unused portions of the address tag fields to build additional associativity classes. The additional associativity classes improve the coherence directory's tracking capability and thereby improve system performance.

One embodiment collapses system memory gaps into a contiguous system memory space such that the total number of address bits required to represent each physical address is reduced. Consequently, the number of address tag bits required by the coherence directory is smaller. Reducing the number of address tag bits enables the full benefit of reclaiming unused tag bits to create additional associativity classes.

As shown in FIG. 1, a system typically includes a memory space 110 that includes a plurality of physically separate nodes 112. Each node 112 has a fixed memory capacity (for example, the maximum capacity per node could be 128 GB), which results in a maximum memory capacity for the entire memory space, represented in a non-contiguous memory map 110 (e.g., 1024 GB, as shown). Frequently, a system will be configured with less actual memory than the system's capacity. Also, each node 112 may be configured differently. In the example shown in FIG. 1, NODE 0 is configured with only 64 GB of actual memory, Node 1 with only 80 GB, etc.

When a memory space is configured in this manner, some addresses to the non-contiguous memory map 110 point to locations that do not contain any physical memory. However, a cache directory used to ensure coherency to this memory space would have to include address tag bits for each possible memory location. Therefore, one embodiment is a system that determines the amount of memory with which each node 112 is actually configured and then collapses the actual configured memory addresses into a memory map 120 that corresponds to only the actual physical memory in the memory space. The memory map 120 includes a plurality of portions 122, wherein each portion 122 corresponds to the physical memory actually configured to a different node 112.

By collapsing each node 112 to a contiguous portion 122 of the memory map 120, the cache coherency directory may require fewer address tag bits per associativity class. In the example shown, the associativity classes in the cache coherency directory would require 40 address tag bits to address all of the memory in the uncollapsed memory space, whereas in the collapsed memory map 120 each associativity class would require only 39 address tag bits to address all of the memory. The bits saved from each of the address tags can be combined to form additional associativity classes, resulting in a system performance enhancement.

In each node of a distributed memory system, the memory base address for every node 112 is already visible in hardware registers (for routing system addresses to the correct node to support coherency). These memory base addresses are for the non-contiguous memory map 110. By creating additional registers to specify either each node's 112 actual physical memory capacity or the "contiguous" equivalent of the memory base addresses, the system non-contiguous memory map 110 may then be "collapsed" or "normalized" to the contiguous memory map 120 prior to extracting the address tag bits for storage within the directory.

Figure 2:
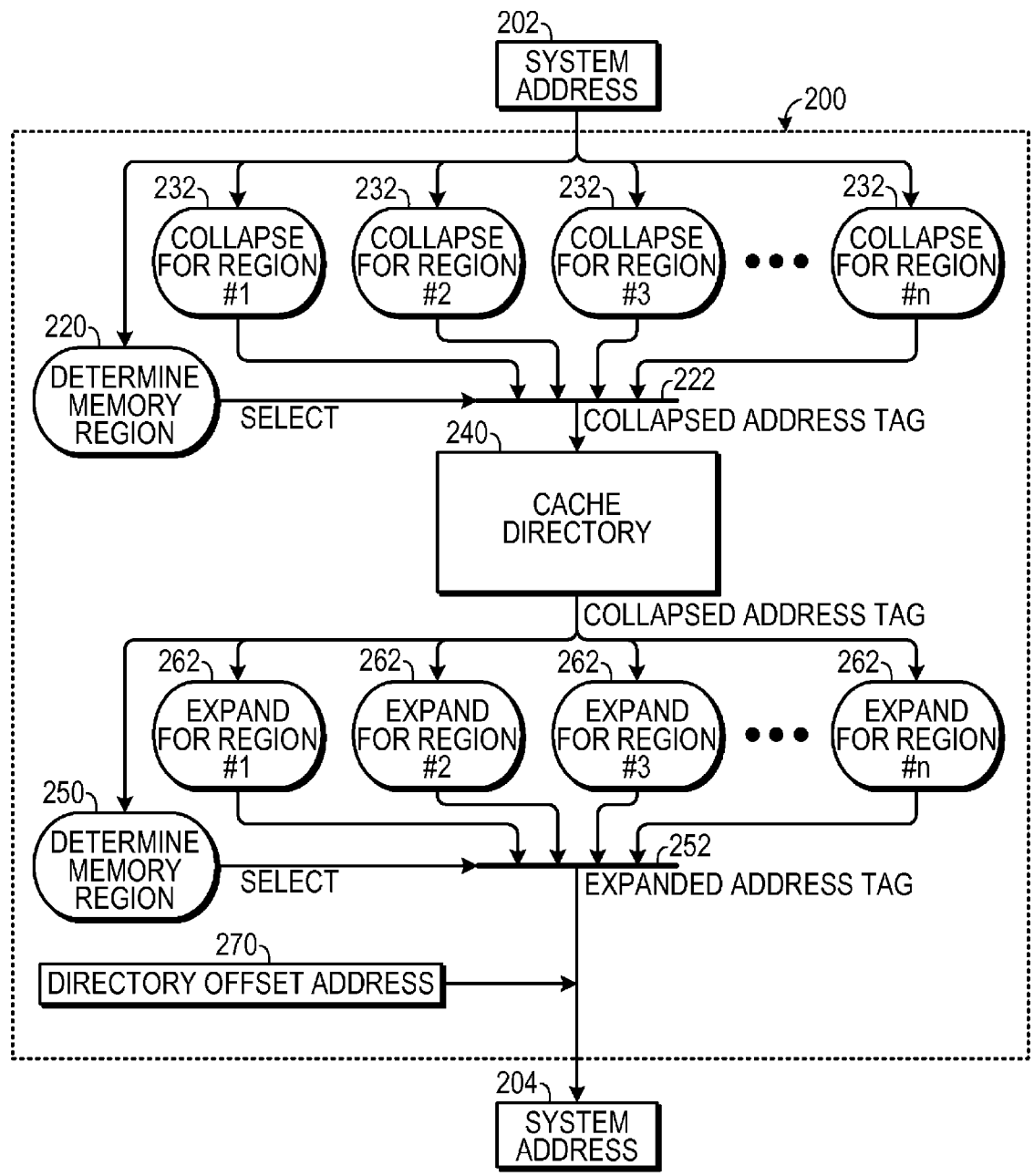
FIG. 2 is a block diagram showing a system for collapsing and expanding a memory space.

One system 200 for normalizing a system address 202 (and for de-normalizing an address taken from a cache directory 240 to generate a restored system address 204) is shown in FIG. 2. When contiguous tags are stored within the cache directory 240, incoming addresses must be normalized before comparing against the directory 240 contents to determine if there is a hit. A memory region detector 220 determines in which node the system address 202 resides. A plurality of node collapsing entities 232 collapses the address space for each node so as to correspond to the amount of actual memory in each node. A collapsed address tag generating entity 222, that is responsive to the detector 220, combines the address of the system address 202 in the node in which it resides with the collapsed memory space of each node below the node in which the system address 202 resides to form a collapsed address tag, which is stored in the cache directory 240.

When a cache line associated with an associativity class must be removed from the cache directory 240 (which might be due to a capacity miss), the address tag from that associativity class is combined with an array index (low-order address bits) to recreate the system address in the contiguous format. The contiguous address must then be converted back to the original non-contiguous address. A memory region determining entity 250 determines which node the expanded address is to be written to and a plurality of region expanding entities 262 generate an expanded address map for each of the nodes below the node to which the expanded address is to be written. An address expanding entity 252 combines the address of the address tag with the memory map for the lower-order nodes so as to generate an expanded address tag. A directory offset address 270 may be also be added to form the restored system address 204. The restored system address 204 may then be sent to other nodes to continue cache coherency management.

Figure 3:
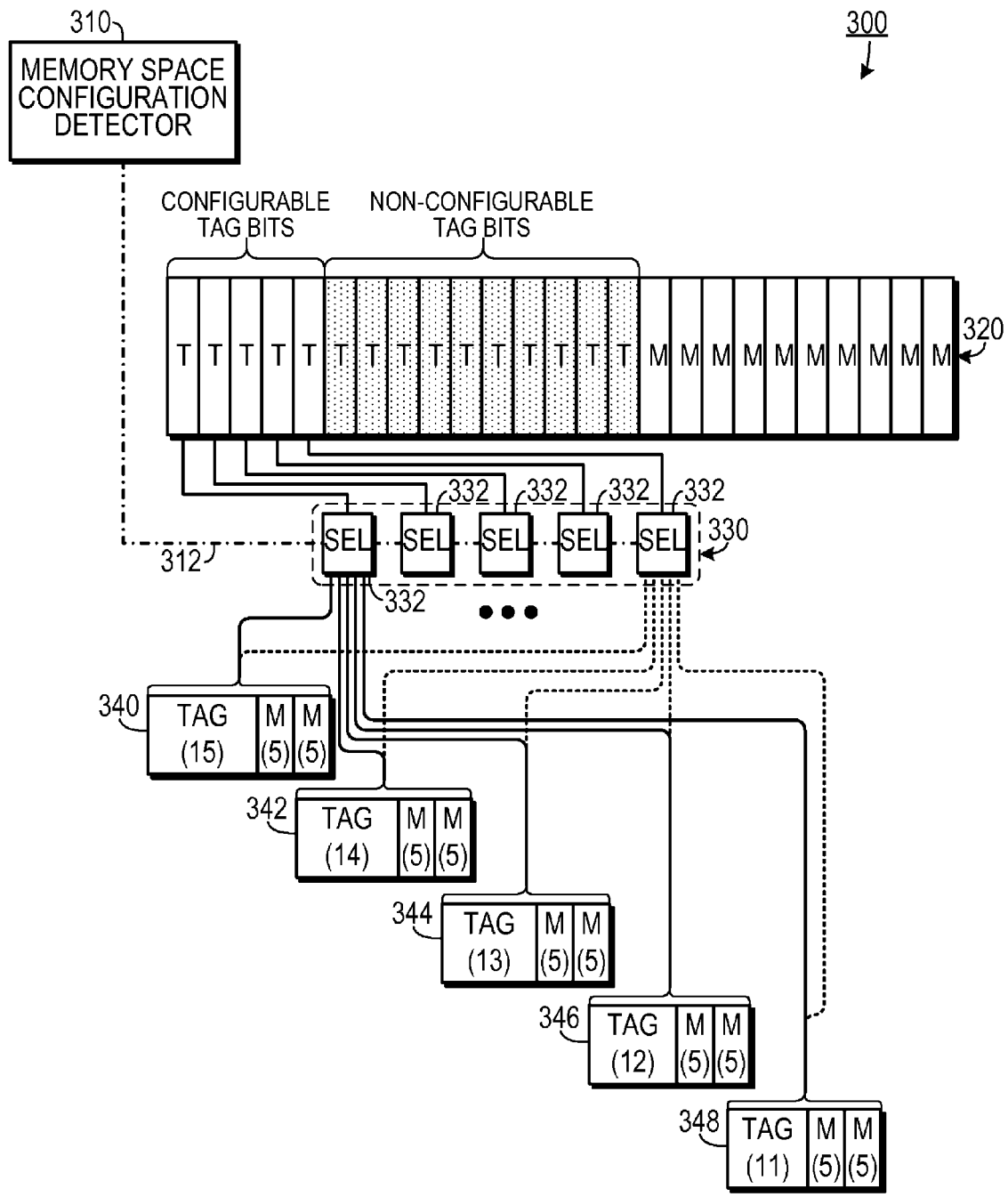
FIG. 3 is a schematic diagram showing a system that reclaims tag bits to create additional associativity classes.

When the total memory configuration for a memory space includes less memory than the maximum configurable amount of memory, the higher order bit of all addresses to the actual memory locations are set to zero (0). Since bits that are always set to zero provide no useful information to the system, these bits can be used to create additional associativity classes within the cache directory. Thus, the embodiment shown in FIG. 3, provides an efficient method to reclaim unused address tag bits and build additional associativity classes when actual installed memory is less than the maximum system capacity. The initial definition of all fields within an associativity set is done in a manner that allows reclaiming the most significant unused address tag bits while minimizing the impact on capacitive loading, wireability, and physical chip area.

In this embodiment, each associativity class 320 will initially be configured with a fixed number of MESI bits (labeled "M") and a fixed number of tag bits (labeled "T"). Some of the higher-order tag bits a configurable so as to be used in different associativity classes if less than the maximum amount of memory is configured into the system. A memory space configuration detector 310 detects the amount of memory with which the system is actually configured and generates a signal 312 representative thereof. The configurable tag bits are each coupled to a different selector 332 of a plurality of selectors 330. Each selector 332 allows the tag bit to which it is coupled to be configured as part of an associativity class (items 340-346), depending on the value of the memory space configuration signal 312. Thus, if the associativity classes are all configured initially with 15 tag bits, the configurable tag bits of any associativity class will all be coupled to a 15 tag bit associativity class 340. If the memory configuration requires only 11 tag bits, the one or more of the configurable tag bits will be coupled to a new associativity class 348 requiring only 11 tag bits. Creating new additional associativity classes in a cache directory when the memory space includes less than the maximum memory configuration results in a more efficient cache directory.

Figure 4A:
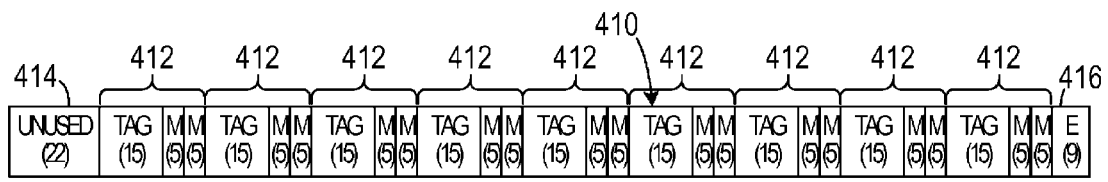
FIG. 4A-C are schematic diagrams showing creation of additional associativity classes from a line in a cache directory.
Figure 4B:
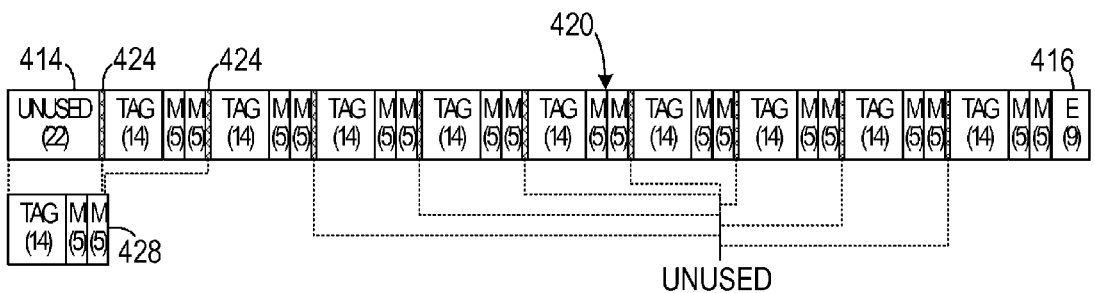
Figure 4C:
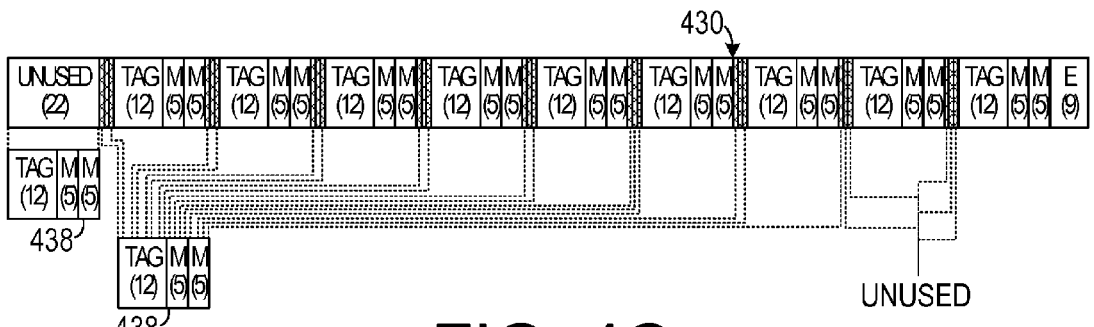

As shown in FIGS. 4A-4C, in one illustrative (and simplified) embodiment of a cache directory, in which each cache line includes 256 bits—which is limited by the physical size of the chip used for the cache directory. A configuration in which the system has a maximum amount of memory is shown in FIG. 4A. In this configuration, each cache line 410 includes 22 unused bits 414; 9 error detection and correction (ECC) bits 416; and 9 associativity classes 412, each of which includes 15 address tag bits and 10 MESI bits. If the memory is configured with less than the maximum amount (e.g., one-half of the maximum), as shown in FIG. 4B, then the unused bits 414 can be combined with the unused highest order bits 424 of two of the associativity classes to make an additional associativity class 428 per cache line 420. If the system employs a still smaller memory configuration (e.g., one-quarter of the maximum), as shown in FIG. 4C, unused highest order bits from several associativity classes can be combined to for two additional associativity classes per cache line 430.

Figure 5A:
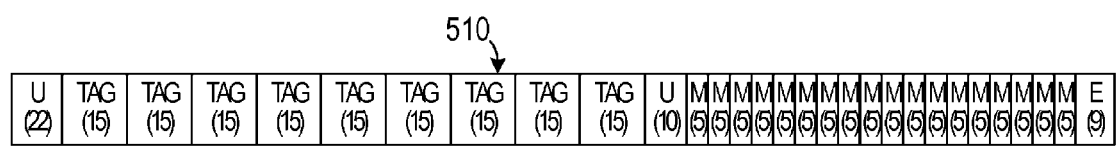
FIG. 5A-B are schematic diagrams showing use of an alternate arrangement of tag bits and MESI bits in a line in a cache directory.
Figure 5B:
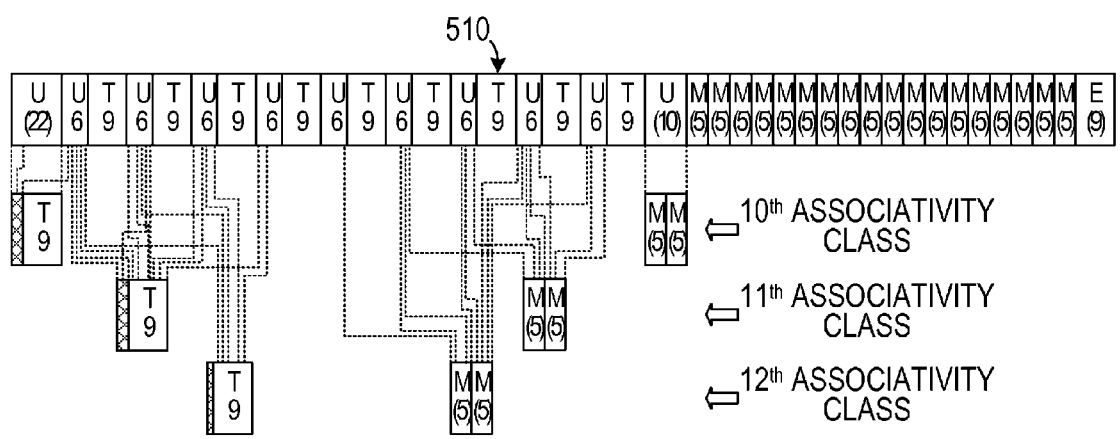

One arrangement of a cache line 510, as shown in FIGS. 5A and 5B, is configured to minimize excess wiring on the chip. This is done by grouping all of the tag bits on one side of the cache line 510 and all of the MESI bits on the other side.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of generating a cache directory to include a plurality of associativity classes, each associativity class including an address tag including a plurality of address bits, each address tag configured to store a unique address to a specific location in an memory space, the method comprising the actions of:
 a. determining an amount of memory that is in an actually configured portion of the memory space;
 b. determining a minimum number of bits necessary to address each memory location in the actually configured portion of the memory space;
 c. configuring each address tag in each associativity class to include the minimum number of bits necessary to address each memory location in the actually configured portion of the memory space;
 d. configuring the cache directory to include a maximum number of associativity classes per line in the cache directory; and
 e. normalizing a system address so as to generate a cache directory address used to access the cache directory,
 wherein the memory space comprises a plurality of nodes, in which each node is configurable up to a predetermined maximum memory capacity, and wherein the action of determining an amount of memory that is in an actually configured portion of the memory space comprises the action of mapping an amount of memory actually configured in each node into a memory map in which the amount of memory actually configured in each node is contiguous with the amount of memory actually configured in another node.

2. The method of claim 1, wherein the system address resides in a node of the plurality of nodes and wherein each of the plurality of nodes is ranked in a hierarchy from lowest to highest and wherein the normalizing step comprises the actions of:
 a. determining a memory configuration for each node lower in the hierarchy below the node in which the system address resides;
 b. creating a memory map that represents each node lower in the hierarchy as a contiguous memory map in which only the memory actually configured in each node is represented in the memory map and in which a highest address in the memory map is designated as a map offset; and
 c. creating a normalized address corresponding to an offset between the system address and a lowest-order address of the node in which the system address resides plus the map offset.

3. The method of claim 1, further comprising the action of de-normalizing a cache directory address in the cache directory when sending the address to a memory system for coherency management.

4. The method of claim 3, wherein the system address resides in a node of the plurality of nodes and wherein each of the plurality of nodes is ranked in a hierarchy from lowest to highest and wherein the de-normalizing step comprises the actions of:
   a. determining in which node the system address resides; and
   b. generating an expanded map of the memory region
   c. determining a memory region offset between the system address and a lowest order address in the memory region;
   d. adding a total amount of memory space in each of the plurality nodes lower than the node in which the system address resides to the memory region offset, thereby generating a de-normalized system address.

5. The method of claim 1, further comprising the action of detecting extra bits wherein an extra bit is defined as a higher order bit in each address tag will always be set to a "0" whenever accessing any memory location in the memory configuration.

6. The method of claim 5, wherein the action of redefining the cache directory comprises the actions of:
   a. defining the cache directory to include a plurality of redefined associativity classes; and
   b. creating at least one new associativity class from the extra bits and including the new associativity class in the cache directory.

7. A method of increasing a number of associativity classes that can be stored in a cache directory in a digital system that employs a memory configuration that employs less than a system maximum amount of memory, comprising the actions of:
   a. identifying extra bits in address tags in existing associativity classes in which the extra bits are not necessary to address the memory configuration; and
   b. redefining the existing associativity classes so as not to require the extra bits;
   c. redefining the cache directory so as to include additional associativity classes that include the extra bits,
   wherein the identifying extra bits action comprises the actions of:
   d. detecting when a node is configured with less memory than a maximum memory capacity of the node;
   e. mapping the memory configured in the node to a memory map in which memory space is allocated to the memory in an amount that is equivalent to only the amount of memory that is actually configured with the node, thereby normalizing the memory space; and
   f. defining the extra bits as being any higher order bits that are not necessary to address the memory space in the memory map.

8. The method of claim 7, further comprising the action of normalizing a system address so as to generate a cache directory address used to access the cache directory.

9. The method of claim 8, wherein the system address resides in a node of the plurality of nodes and wherein each of the plurality of nodes is ranked in a hierarchy from lowest to highest and wherein the normalizing step comprises the actions of:
   a. determining a memory configuration for each node lower in the hierarchy below the node in which the system address resides;
   b. creating a memory map that represents each node lower in the hierarchy as a contiguous memory map in which only the memory actually configured in each node is represented in the memory map and in which a highest address in the memory map is designated as a map offset; and
   c. creating a normalized address corresponding to an offset between the system address and a lowest-order address of the node in which the system address resides plus the map offset.

10. The method of claim 7, further comprising the action of de-normalizing a cache directory address in the cache directory when sending the address to a memory system for coherency management.

11. The method of claim 10, wherein the system address resides in a node of the plurality of nodes and wherein each of the plurality of nodes is ranked in a hierarchy from lowest to highest and wherein the de-normalizing step comprises the actions of:
   a. determining in which node the system address resides; and
   b. generating an expanded map of the memory region
   c. determining a memory region offset between the system address and a lowest order address in the memory region;
   d. adding a total amount of memory space in each of the plurality nodes lower than the node in which the system address resides to the memory region offset, thereby generating a de-normalized system address.

12. The method of claim 7, wherein the identifying extra bits action comprises the action of detecting when at least one higher order bit in each address tag will always be set to a "0" whenever accessing any memory location in the memory configuration.

13. The method of claim 12, wherein the action of redefining the cache directory comprises the actions of:
   a. defining the cache directory to include a plurality of redefined associativity classes, each redefined associativity class including fewer bits than included in each of the existing associativity classes; and
   b. creating at least one new associativity class from the extra bits and including the new associativity class in the cache directory.

14. A cache directory for managing cache coherency with respect to an memory space, comprising:
   a. a memory space configuration detector that generates a configuration signal having a value representative of an actual amount of physical memory configured in the memory space;
   b. a plurality of cache lines, each comprising a plurality of address tag bits and a plurality of MESI bits; and
   c. a plurality of selectors, each selector coupled to a different one of the address tag bits and responsive to the configuration signal, each selector configured to direct a data value of an address tag bit to a selected one of a plurality of different associativity classes in the cache directory, depending on the value of the configuration signal.

* * * * *